United States Patent [19]
Liu

[11] Patent Number: 5,407,216
[45] Date of Patent: Apr. 18, 1995

[54] WHEEL-DRIVEN PERCUSSION INSTRUMENT FOR A BABY CAR

[76] Inventor: Yu-Mean Liu, 2F., No. 34, Lane 200, Tung Hwa Street, Taipei, Taiwan, Prov. of China

[21] Appl. No.: 192,600
[22] Filed: Feb. 7, 1994
[51] Int. Cl.⁶ .............................................. A63H 5/00
[52] U.S. Cl. .................................. 280/1.14; 446/409; 446/422
[58] Field of Search ........................... 280/1.14, 288.4; 446/409, 411, 413, 418, 421, 422

[56] References Cited
U.S. PATENT DOCUMENTS 4,759,557  7/1988  Kassai ................................ 280/1.14
5,011,451  4/1991  Holtier ............................... 446/409

Primary Examiner—Margaret A. Focarino
Assistant Examiner—Victor E. Johnson
Attorney, Agent, or Firm—Varndell Legal Group

[57] ABSTRACT

A wheel-driven percussion instrument includes a cam made on an inner side of one wheel of a baby car. A spring supported transmission rod in a casing at the bottom of the baby car reciprocates by action of the cam. Two metal plates bilaterally disposed inside the casing, and pendulum horizontally is disposed inside the casing. When the transmission rod reciprocates, the pendulum is moved to sound the metal plates alternatively.

1 Claim, 3 Drawing Sheets

WHEEL-DRIVEN PERCUSSION INSTRUMENT FOR A BABY CAR

BACKGROUND AND SUMMARY OF THE INVENTION

The present invention relates to a wheel-driven percussion instrument for a baby car which is driven to sound two metal plates alternatively when the baby car is moving.

Various baby cars are known having different toy musical instruments for playing by the children who ride and sit on them. The toy musical instrument of a conventional baby car does not make sound automatically during the movement of the baby car. While riding the baby car, the child can not play the toy musical instrument. Therefore, conventional baby cars do not produce any sound effect when they are moving.

The present invention has been accomplished under the aforesaid circumstances. It is therefore the principal object of the present invention to provide a wheel-driven percussion instrument for a baby car which automatically makes sound when the baby car is moving. According to the present invention, a transmission rod is supported on a spring and reciprocated by a cam on an inner side of one wheel of the baby car, and a pendulum is horizontally suspended below the chassis of the baby car and driven by the transmission rod through a link to sound two vertical metal plates alternatively.

DETAILED DESCRIPTION OF THE PREFERRED EMBODIMENT

Figure 1:
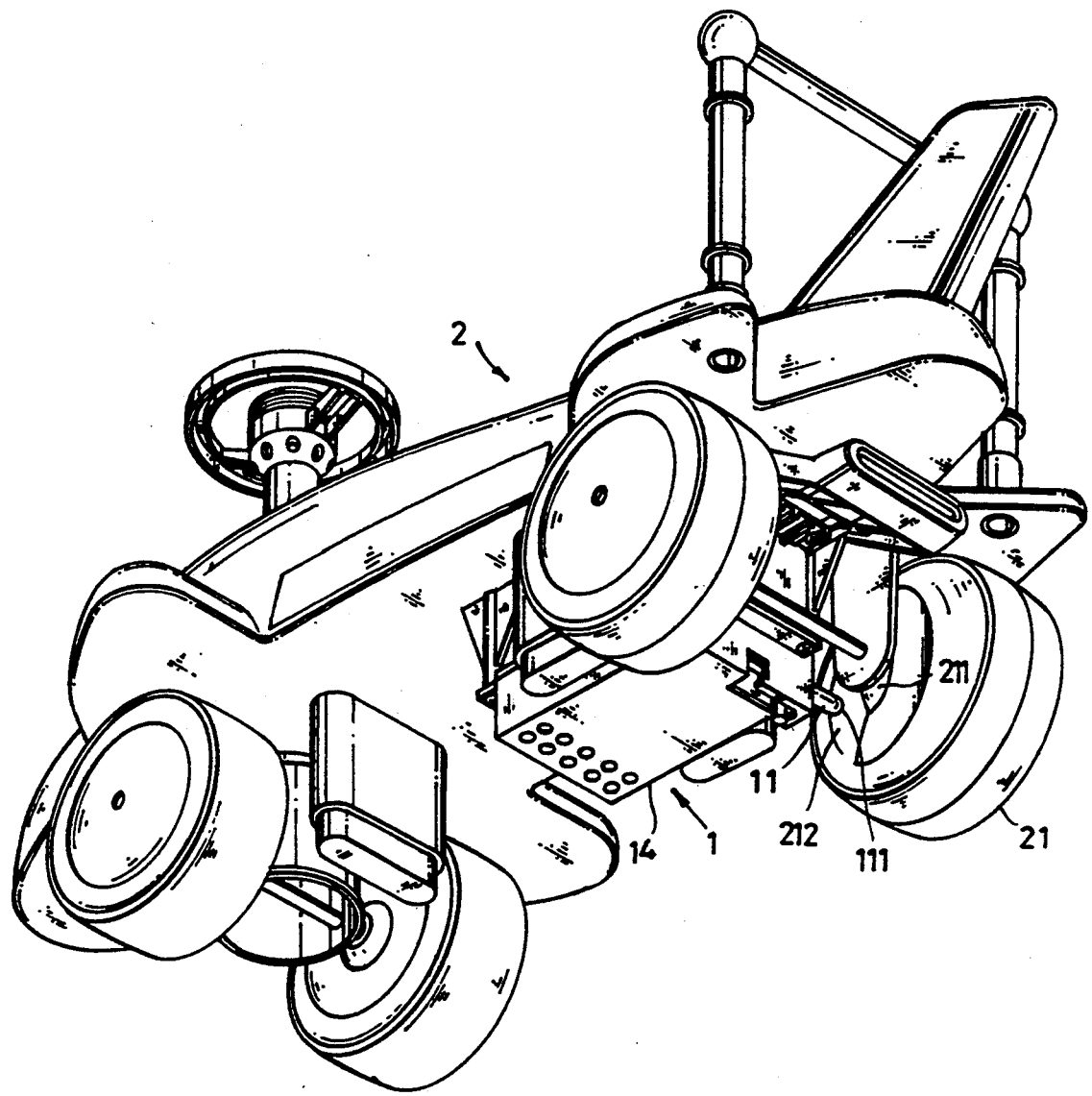
FIG. 1 is an elevational view of the preferred embodiment of the present invention.
Figure 2:
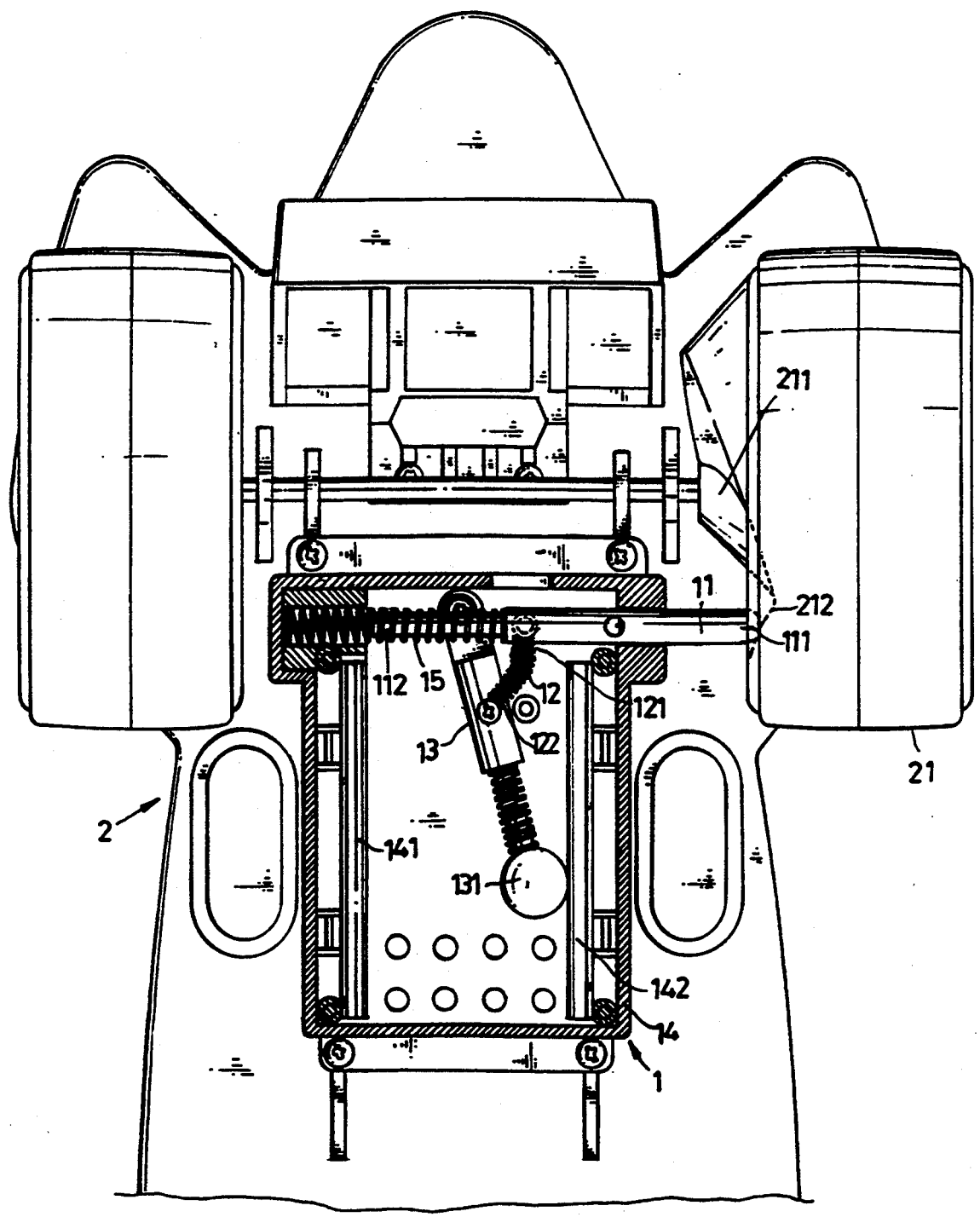
FIG. 2 is a bottom view in section of the preferred embodiment of the present invention showing the transmission rod moved rightward.

Referring to FIGS. 1 and 2, a wheel-driven percussion instrument 1 is mounted on the chassis of a baby car 2 at the bottom and driven by one wheel 21 of the baby car 2. The wheel has a raised portion 211 and a recessed portion 212 linked on an inner side thereof. The raised portion 211 and recessed portion 212 of the wheel form a cam. The percussion instrument 1 comprises a casing 14 affixed to the chassis of the baby car 2 at the bottom thereof, a first metal plate 141 and a second metal plate 142 arranged or bilaterally and vertically suspended inside the casing 14, (in the interior of the casing) a transmission rod 11 having an inner end 112 supported on a spring 15 inside the casing 14 and an outer end 111 extending out of the casing 14 through a hole thereof and stopped at the inner side of the wheel 21, a pendulum 13 having a fixed end horizontally pivoted to one side of the casing 14 on the inside and a free end terminating in a hammer head 131, a link 12 having one end 121 pivoted to the transmission rod 11 in the middle and an opposite end 122 pivoted to the pendulum in the middle.

Figure 3:
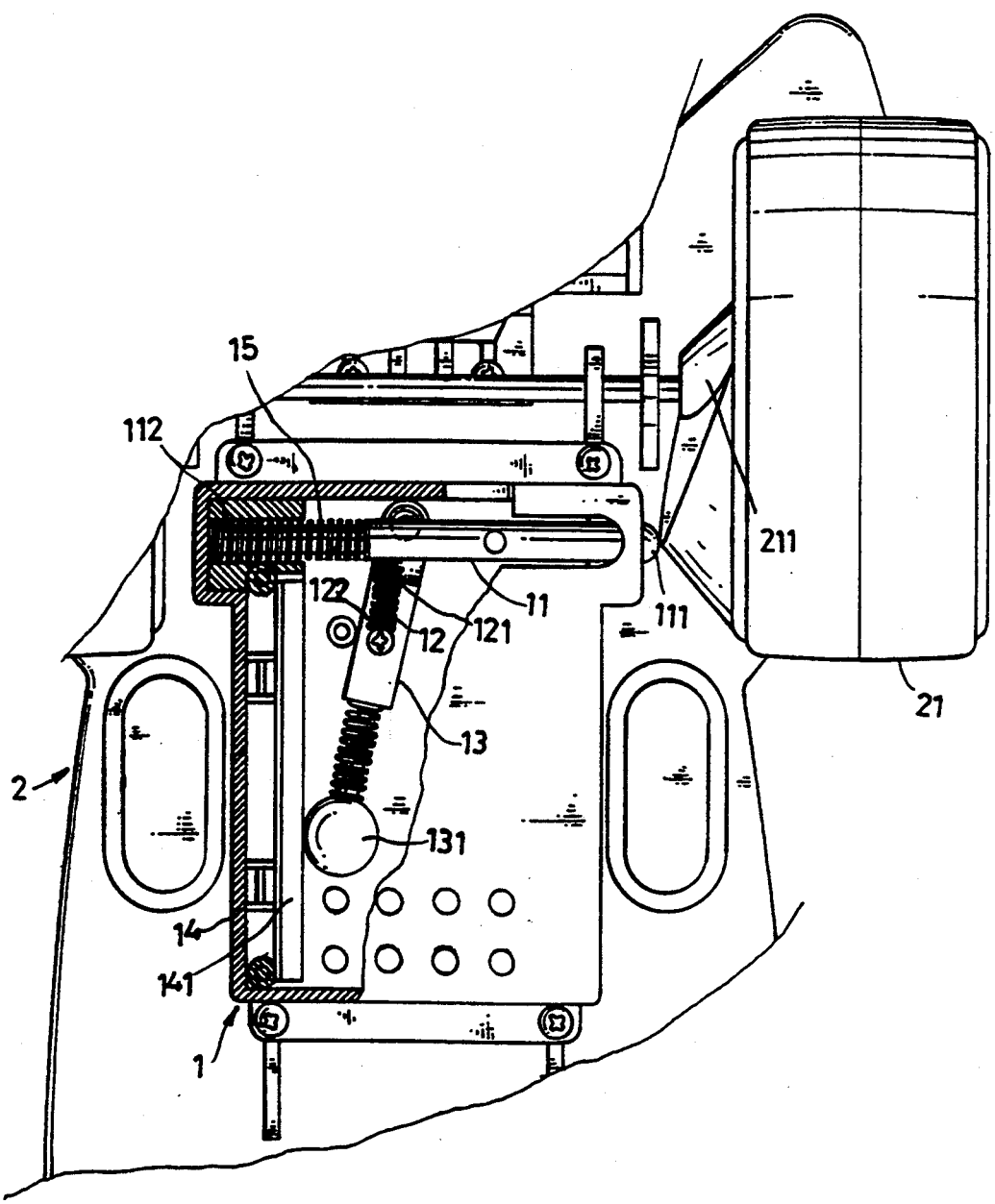
FIG. 3 is similar to FIG. 2 but showing the transmission rod moved leftward.

Referring to FIGS. 2 and 3, when the wheel 21 is rotated to move the baby car 2, the raised portion 211 and recessed portion 212 of the wheel 21 are continuously and alternatively moved against the outer end 111 of the transmission rod causing the transmission rod 11 reciprocated. When the transmission rod 11 is moved rightward, the hammer head 131 of the pendulum 13 is driven by the link 12 to hit the second metal plate 142 causing a sound to be produced; when the transmission rod 11 is moved leftward, the hammer head 131 of the pendulum 13 is driven by the link 12 to hit the first metal plate 141 causing another sound to be produced. Therefore, when the wheel 21 is turned to reciprocate the transmission rod 11, the pendulum 13 is driven to swing to and fro, causing the hammer head 131 to sound the first and second metal plates 141, 142 alternatively.

I claim:

1. A wheel-driven percussion instrument for a baby car having a wheel and a chassis, which comprises a cam arranged on an inner side of said wheel; a casing mounted on said chassis; said casing having an interior and a hole; a first metal plate and a second metal plate arranged within said interior of said casing; a transmission rod having a middle, a first end supported on a spring within said interior of said casing, and a second end extending out of said hole of said casing and riding on said cam; a pendulum having a middle, a fixed end horizontally pivoted to one side of said interior of said casing, and a free end terminating in a hammer head; a link having one end pivoted to said middle of said transmission rod and an opposite end pivoted to said middle of said pendulum; wherein turning of said one wheel by movement of said baby car rotates said cam causing said transmission rod riding thereon to reciprocate, and the reciprocating action of said transmission rod moves said pendulum through said link causing said hammer head of said pendulum to alternatively strike and sound said first and second metal plates.

* * * * *